US008594737B2

(12) United States Patent
Walker et al.

(10) Patent No.: US 8,594,737 B2
(45) Date of Patent: Nov. 26, 2013

(54) SYSTEM AND METHOD FOR LOCATING A MISPLACED MOBILE DEVICE

(75) Inventors: David Ryan Walker, Waterloo (CA); Erica Maureen Fensom, Crownsville, MD (US)

(73) Assignee: BlackBerry Limited, Waterloo (CA)

( * ) Notice: Subject to any disclaimer, the term of this patent is extended or adjusted under 35 U.S.C. 154(b) by 225 days.

(21) Appl. No.: 13/081,229

(22) Filed: Apr. 6, 2011

(65) Prior Publication Data

US 2012/0258701 A1 Oct. 11, 2012

(51) Int. Cl.
*H04B 1/38* (2006.01)

(52) U.S. Cl.
USPC ........ 455/563; 455/410; 455/411; 455/456.1; 455/456.2; 704/246

(58) Field of Classification Search
USPC ........... 455/410, 411, 418, 419, 456.1–456.3, 455/456.6, 563; 704/201, 220, 221–223, 704/231, 243, 246–250
See application file for complete search history.

(56) References Cited

U.S. PATENT DOCUMENTS

| | | | |
|---|---|---|---|
| 2005/0159959 A1* | 7/2005 | Benco et al. | 704/277 |
| 2005/0256720 A1* | 11/2005 | Iorio | 704/275 |
| 2007/0254697 A1* | 11/2007 | Sugio et al. | 455/556.2 |
| 2009/0280789 A1* | 11/2009 | Takuno et al. | 455/418 |
| 2010/0216446 A1 | 8/2010 | Chang | |
| 2010/0291976 A1* | 11/2010 | Wu et al. | 455/574 |
| 2011/0045836 A1* | 2/2011 | Hamalainen et al. | 455/446 |
| 2011/0159845 A1* | 6/2011 | Sanjeev | 455/411 |
| 2011/0207439 A1* | 8/2011 | Ross et al. | 455/414.1 |

FOREIGN PATENT DOCUMENTS

WO 2009018125 A1 2/2009

OTHER PUBLICATIONS

Extended European Search Report dated Oct. 5, 2011 from corresponding application No. 11161388.1.
Berry locator—Retrieve your losr BlackBerry by just sending an e-mail. http://web.archive.org/web/20100703224357/http://www.mobireport.com/apps/b1., accessed Jun. 29, 2010.
Phone Halo—How to find a Lost Phone—http://www.web.archive.org/web/20100726l2/http://www.phonehalo.com/products/. accessed Jun. 29, 2010.
Antonio Wells Phone Halo Protect (Jun. 15, 2010), online: Android Tapp <http://www.androidtapp.com/phone-halo-protect/>, accessed Jun. 29, 2010.
Nathesh, "Zenprise Device Manager Can Help Users Locate Lost BlackBerries" (May 5, 2009), online: TMCnet <http://fixed-mobile-convergence.tmcnet.com/topics/mobile-communications/articles/55558-zenprise-device-manager-help-users-locate-lost-blackberries.htm>, accessed Jun. 29, 2010.

(Continued)

*Primary Examiner* — Allahyar Kasraian
(74) *Attorney, Agent, or Firm* — Novak Druce Connolly Bove + Quigg LLP

(57) ABSTRACT

A system and method for activating a location feature for a misplaced mobile device. The method can include receiving an audio command and comparing the received audio command to one or more stored audio commands. In the event the received audio command matches a stored audio command, the method further activates a location feature. The location feature can include activating a ringer, activating a ring tone, causing vibrations, and flashing one or more light or any combination thereof. The ring tone can be a location ring tone. The location feature can be deactivated in response to a preset duration lapsing or receiving a termination command.

15 Claims, 6 Drawing Sheets

(56) References Cited

OTHER PUBLICATIONS

Tricia Goss, "Guide to Finding a GPS Cell Phone Location Using the Internet for Free or Cheap" (Mar. 31, 2009), online: Bright Hub <http://www.brighthub.com/electronics/gps/articles/40464.aspx#ixzz0sHQB11OD>, accessed Jun. 29, 2010.

Alrady, "How to Locate a Lost Cell Phone—FREE spring advice", online: eHow.com ,pp. 1-5 ; accessed Jun. 29, 2010.

Examination Report mailed May 15, 2013, in corresponding European patent application No. 11161388.1.

* cited by examiner

SYSTEM AND METHOD FOR LOCATING A MISPLACED MOBILE DEVICE

FIELD OF TECHNOLOGY

The instant disclosure relates generally to a system and method for locating a misplaced mobile device. More specifically, the instant disclosure relates to a system and method for using a location function to allow a user to locate a misplaced mobile device in response to a voice command received by the misplaced mobile device.

BACKGROUND

Users are becoming more dependent on their mobile devices. As a result, some users no longer have a landline based telephone at their homes. However, given the portability of the mobile devices, the mobile devices can be misplaced. For example, a user may place the mobile device down when the user arrives at home. Later on, when the user needs to use the mobile device, the user may have forgotten where the mobile device was placed. As a result, the user can spend time looking for the misplaced mobile device which not only wastes time but can also frustrate the user. In order to find the misplaced mobile device, some users may use another device, such as a landline based telephone or another mobile device, to call the misplaced mobile device and listen for a ring emanating from the misplaced mobile device. However, in the event the ringer of the misplaced mobile device is set to a low volume or turned off, the user may not be able to locate the misplaced mobile device. If the misplaced mobile device is at a different location than the user, the user will not be able to locate the misplaced mobile device. For example, if a mobile device was left in an office, the user may not be able to locate the mobile device if the user is searching in a house. Using a conventional location system, the user may obtain a general location of the misplaced mobile device. For example, using a second communication device, such as a landline based telephone, another mobile device or a computer, the user can obtain the global positioning system (GPS) coordinates or a general location of the misplaced mobile device. The general location can be an address associated with the GPS coordinates. However, simply knowing the location of the misplaced mobile device may not be sufficient to locate the misplaced mobile device.

BRIEF DESCRIPTION OF THE DRAWINGS

Implementations of the instant disclosure will now be described, by way of example only, with reference to the attached Figures, wherein.

DETAILED DESCRIPTION

Figure 1:
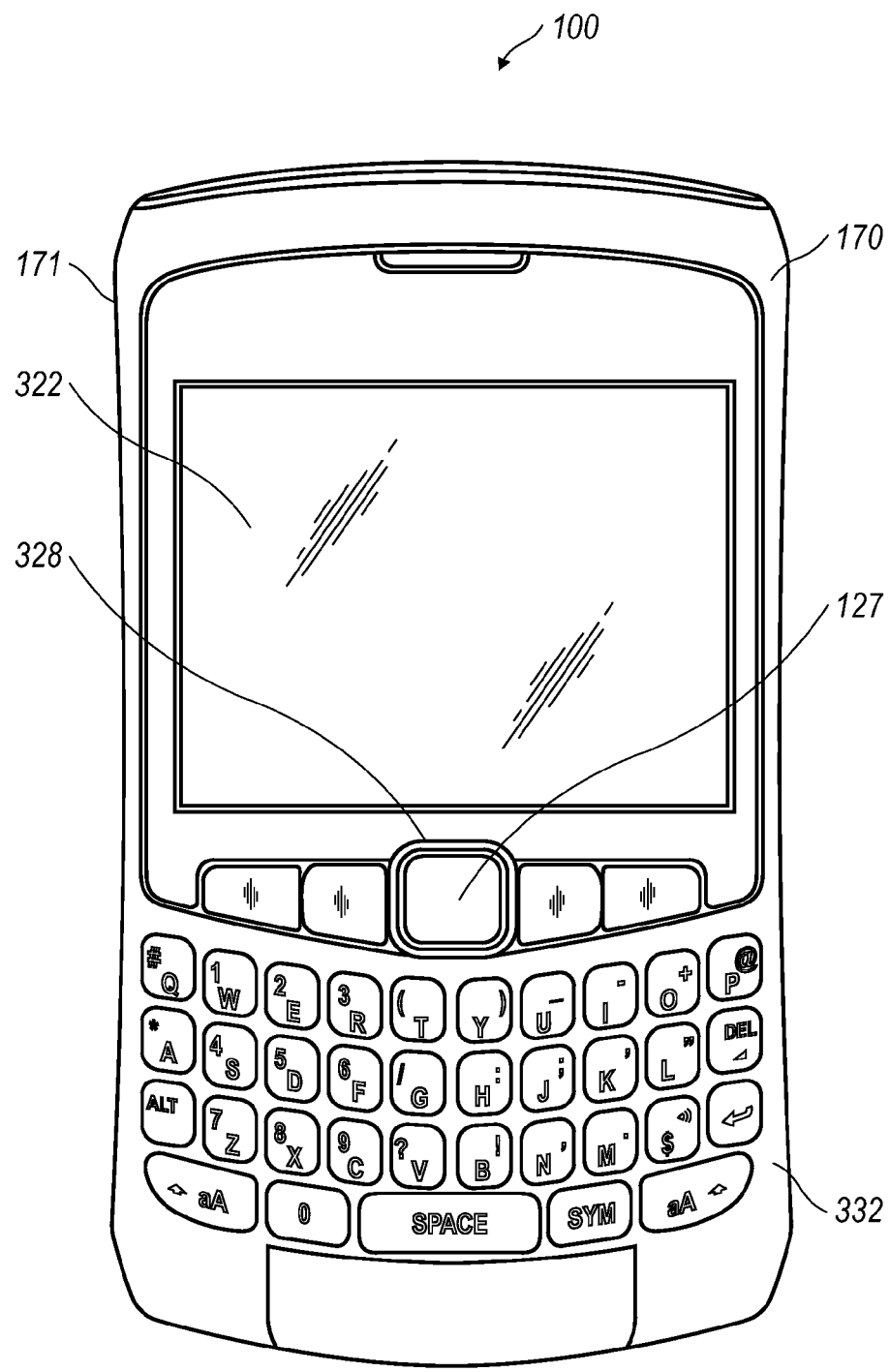
FIG. 1 is a front view of a mobile device having a physical keyboard in accordance with an exemplary implementation.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, methods, procedures and components have not been described in detail so as not to obscure the embodiments described herein. Also, the description is not to be considered as limiting the scope of the embodiments described herein.

Several definitions that apply throughout this disclosure will now be presented. The word "coupled" is defined as connected, whether directly or indirectly through intervening components, and is not necessarily limited to physical connections. The term "communicatively coupled" is defined as connected, whether directly or indirectly through intervening components, is not necessarily limited to a physical connection, and allows for the transfer of data. The term "mobile device" is defined as any mobile device that is capable of at least accepting information entries from a user and includes the device's own power source. A "wireless communication" means communication that occurs without wires using electromagnetic radiation. The term "memory" refers to transitory memory and non-transitory memory. For example, non-transitory memory can be implemented as Random Access Memory (RAM), Read-Only Memory (ROM), flash, ferromagnetic, phase-change memory, and other non-transitory memory technologies. The term "mobile device" refers to a handheld wireless communication device, a handheld wired communication device, a personal digital assistant (PDA) or any other device that is capable of transmitting and receiving information from a communication network.

Figure 2:
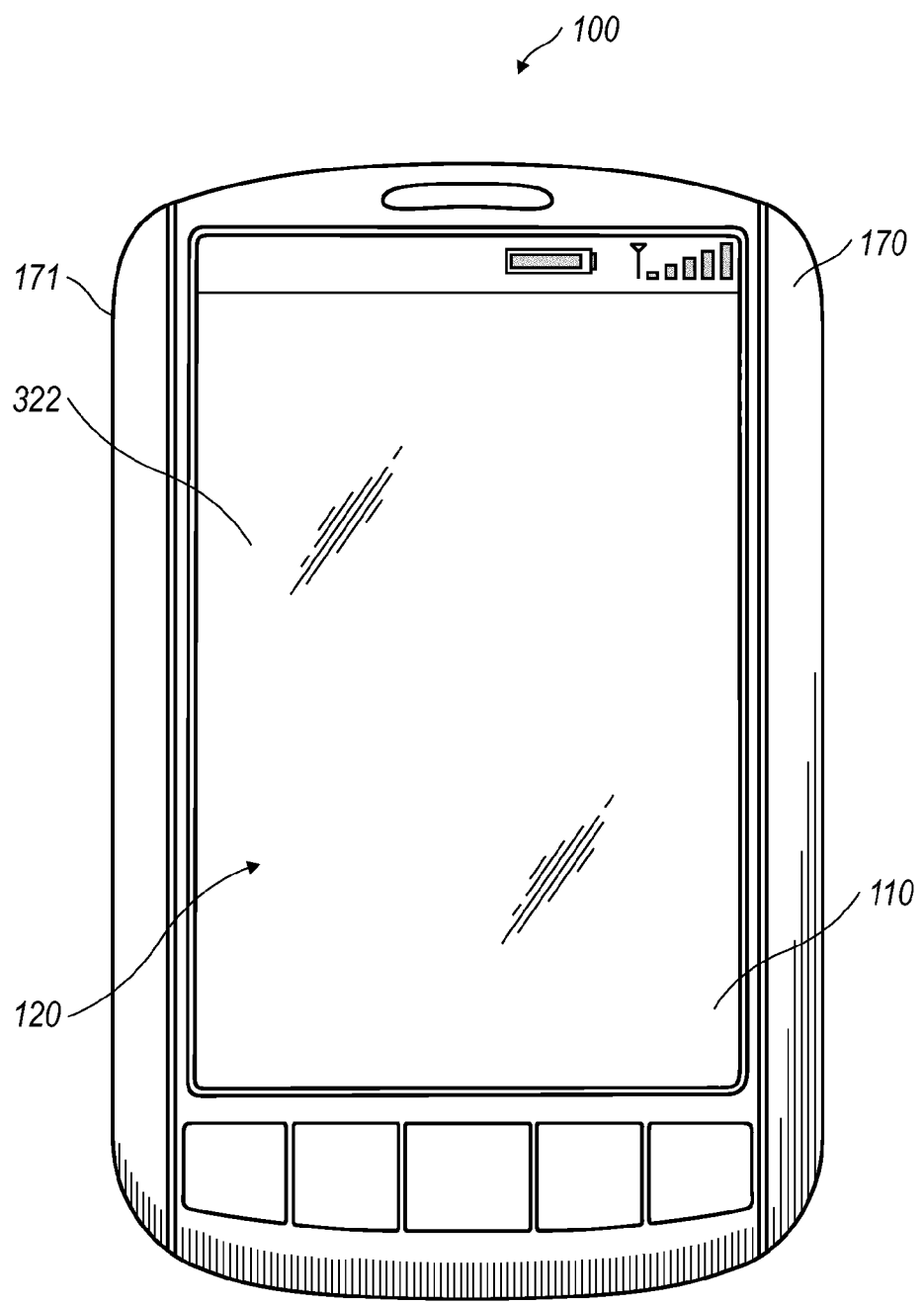
FIG. 2 is a front view of a mobile device having a touch-sensitive display in accordance with an exemplary implementation.

Referring to FIGS. 1 and 2, front views of a mobile device having a keyboard and a mobile device having a touch-sensitive display in accordance with exemplary implementations are illustrated, respectively. The exemplary embodiments depicted in the figures are provided for illustration purposes and those persons skilled in the art will appreciate that the mobile devices 100 can include additional elements and modifications necessary to make the mobile device 100 operable in particular network environments.

As shown in FIG. 1, the mobile device 100 can include a body 171 housing a lighted display 322, a navigational tool (auxiliary input) 328 and a keyboard 332 suitable for accommodating textual input. The mobile device 100 of FIG. 1 can be a unibody construction, but common "clamshell" or "flip-phone" constructions are also suitable for the embodiments disclosed herein. The display 322 can be located above the keyboard 332. The navigational tool (auxiliary input) 328, such as an optical navigational pad 127, can be located essentially between the display 322 and the keyboard 332 on a front face 170. The keyboard 332 can comprise a plurality of keys with which alphabetic letters are associated, but at least a portion of the individual keys have multiple letters associated therewith. This type of configuration is referred to as a reduced keyboard (in comparison to the full keyboard described immediately above) and can, among others come in QWERTY, QWERTZ, AZERTY, and Dvorak layouts.

As shown in FIG. 2, the mobile device 100 can include a body 171 housing a display 322, touch location sensor 110 and a transparent cover lens 120 on a front face 170. In at least one embodiment, the touch location sensor 110 can be provided on a portion of the display 322. In other embodiments, the touch location sensor 110 can be a separate component that is provided as part of the touch-sensitive display 322. As illustrated, the touch location sensor 110 can be shown as located above the display 322, but in other embodiments the touch location sensor 110 can be located below the display 322. The touch location sensor 110 can be a capacitive, resistive or other touch sensitive sensor. The display 322 can be a liquid crystal display (LCD) or a light emitting diode (LED) display. It is also contemplated within this disclosure that the display 322 can be another type of device which is capable of visually displaying information.

Figure 3:
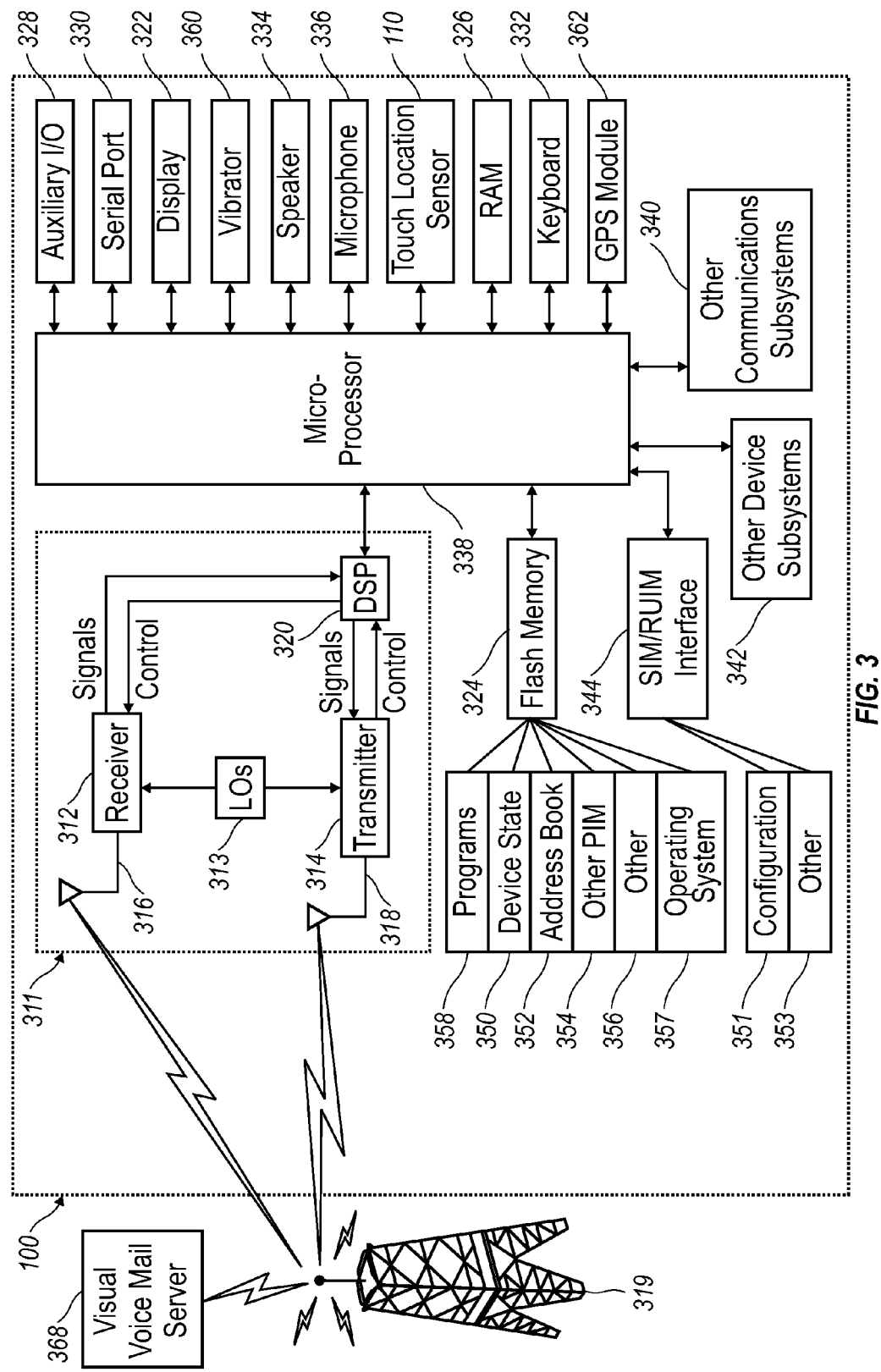
FIG. 3 a block diagram representing a mobile device interacting in a communication network in accordance with an exemplary implementation.

Referring to FIG. 3, a block diagram representing a mobile device interacting in a communication network in accordance with an exemplary implementation is illustrated. As shown, the mobile device 100 can include a processor or microprocessor 338 (hereinafter a "processor") that controls the operation of the mobile device 100. A communication subsystem 311 can perform all communication transmission and reception with the wireless network 319. The processor 338 can be communicatively coupled to an auxiliary input/output (I/O) subsystem 328 which can be communicatively coupled to the mobile device 100. Additionally, in at least one embodiment, the processor 338 can be communicatively coupled to a serial port (for example, a Universal Serial Bus port) 330 that facilitates communication with other devices or systems via the serial port 330. A display 322 can be communicatively coupled to processor 338 to display information to an operator of the mobile device 100. When the mobile device 100 is equipped with a keyboard 332, which may be physical or virtual, the keyboard 332 can be communicatively coupled to the processor 338. The mobile device 100 can include a speaker 334, a microphone 336, random access memory 326 (RAM), and flash memory 324, all of which may be communicatively coupled to the processor 338.

Additionally, a vibrator 360 comprising a vibrator motor can be communicatively coupled to the processor 338. The vibrator 360 can generate vibrations in the mobile device 100. The mobile device 100 can include a global positioning system (GPS) module 362 communicatively coupled to the processor 338. The GPS module 362 can acquire the GPS data for a mobile device 100. The GPS data can include, but not limited to, GPS coordinates of the mobile device 100, geo-location of the mobile device 100 or both. The GPS coordinates can include the latitude and longitude coordinates for the mobile device 100. The geo-location can include a street address for the mobile address, e.g., 123 Main Street. In one or more embodiments, the GPS module 362 can acquire the GPS data of the mobile device 100 using satellites, determining the closest cell tower, triangulation based on three or more cell towers, or other known methods for determining the location of the mobile device 100. The mobile device 100 can include other similar components that are optionally communicatively coupled to the processor 338. Other communication subsystems 340 and other device subsystems 342 can be generally indicated as being communicatively coupled to the processor 338. An example of a communication subsystem 340 is a short range communication system such as BLUETOOTH® communication module or a WI-FI® communication module (a communication module in compliance with IEEE 802.11b). These subsystems 340, 342 and their associated circuits and components can be communicatively coupled to the processor 338. Additionally, the processor 338 can perform operating system functions and can enable execution of programs on the mobile device 100. In some embodiments the mobile device 100 does not include all of the above components. For example, in at least one embodiment the keyboard 332 is not provided as a separate component and can be integrated with a touch-sensitive display 322 as described below.

Furthermore, the mobile device 100 can be equipped with components to enable operation of various programs. In an exemplary embodiment, the flash memory 324 can be enabled to provide a storage location for the operating system 357, device programs 358, and data. The operating system 357 can be generally configured to manage other programs 358 that are also stored in memory 324 and executable on the processor 338. The operating system 357 can honor requests for services made by programs 358 through predefined program interfaces. More specifically, the operating system 357 can determine the order in which multiple programs 358 are executed on the processor 338 and the execution time allotted for each program 358, manages the sharing of memory 324 among multiple programs 358, handles input and output to and from other device subsystems 342, and so on. In addition, operators can typically interact directly with the operating system 357 through a user interface usually including the display screen 322 and keyboard 332. While in an exemplary embodiment the operating system 357 can be stored in flash memory 324, the operating system 357 in other embodiments is stored in read-only memory (ROM) or similar storage element (not shown). As those skilled in the art will appreciate, the operating system 357, device program 358 or parts thereof can be loaded in RAM 326 or other volatile memory. In one exemplary embodiment, the flash memory 324 can contain programs 358 for execution on the mobile device 100 including an address book 352, a personal information manager (PIM) 354, and the device state 350. Furthermore, programs 358 and other information 356 including data can be segregated upon storage in the flash memory 324 of the mobile device 100.

When the mobile device 100 is enabled for two-way communication within the wireless communication network 319, the mobile device 100 can send and receives signal from a mobile communication service. Examples of communication systems enabled for two-way communication can include, but are not limited to, the General Packet Radio Service (GPRS) network, the Universal Mobile Telecommunication Service (UMTS) network, the Enhanced Data for Global Evolution (EDGE) network, the Code Division Multiple Access (CDMA) network, High-Speed Packet Access (HSPA) networks, Universal Mobile Telecommunication Service Time Division Duplexing (UMTS-TDD), Ultra Mobile Broadband (UMB) networks, Worldwide Interoperability for Microwave Access (WiMAX), and other networks that can be used for data and voice, or just data or voice. For the systems listed above, the mobile device 100 can require a unique identifier to enable the mobile device 100 to transmit and receive signals from the communication network 319. Other systems may not require such identifying information. GPRS, UMTS, and EDGE use a Subscriber Identity Module (SIM) in order to allow communication with the communication network 319. Likewise, most CDMA systems can use a Removable User Identity Module (RUIM) in order to communicate with the CDMA network. The RUIM and SIM card can be used in a multitude of different mobile devices 100. The mobile device 100 can operate some features without a SIM/RUIM card, but a SIM/RUIM card is necessary for communication with the network 319. A SIM/RUIM interface 344 located within the mobile device 100 can allow for removal or insertion of a SIM/RUIM card (not shown). The SIM/RUIM card can feature memory and holds key configurations 351, and other information 353 such as identification and subscriber related information. With a properly enabled mobile device 100, two-way communication between the mobile device 100 and communication network 319 can be possible.

If the mobile device 100 is enabled as described above or the communication network 319 does not require such enablement, the two-way communication enabled mobile device 100 is able to both transmit and receive information from the communication network 319. The transfer of communication can be from the mobile device 100 or to the mobile device 100. In order to communicate with the communication network 319, the mobile device 100 in the presently described exemplary embodiment can be equipped with an integral or internal antenna 318 for transmitting signals to the communication network 319. Likewise the mobile device 100 in the presently described exemplary embodiment can be equipped with another antenna 316 for receiving communication from the communication network 319. These antennae (316, 318) in another exemplary embodiment can be combined into a single antenna (not shown). As one skilled in the art would appreciate, the antenna or antennae (316, 318) in another embodiment can be externally mounted on the mobile device 100.

When equipped for two-way communication, the mobile device 100 can include a communication subsystem 311. As is understood in the art, this communication subsystem 311 can support the operational needs of the mobile device 100. The subsystem 311 can include a transmitter 314 and receiver 312 including the associated antenna or antennae (316, 318) as described above, local oscillators (LOs) 313, and a processing module 320 which in the presently described exemplary embodiment can be a digital signal processor (DSP) 320.

Communication by the mobile device 100 with the wireless network 319 can be any type of communication that both the wireless network 319 and mobile device 100 are enabled to transmit, receive and process. In general, these can be classified as voice and data. Voice communication generally refers to communication in which signals for audible sounds are transmitted by the mobile device 100 through the communication network 319. Data generally refers to all other types of communication that the mobile device 100 is capable of performing within the constraints of the wireless network 319.

While the above description generally describes the systems and components associated with a handheld mobile device, the mobile device 100 can be another communication device such as a PDA, a laptop computer, desktop computer, a server, or other communication device. In those embodiments, different components of the above system might be omitted in order provide the desired mobile device 100. Additionally, other components not described above may be required to allow the mobile device 100 to function in a desired fashion. The above description provides only general components and additional components can be required to enable system functionality. These systems and components would be appreciated by those of ordinary skill in the art.

Auxiliary I/O subsystem 328 comes in a variety of different forms including a navigational tool 328. Navigational tools can include one or more optical navigational pads, rotatable thumb wheels, joysticks, touchpads, four-way cursors, trackball based devices and the like. The preferred embodiment of the navigational tool 328 is an optical navigational based device. Other auxiliary I/O subsystems capable of providing input or receiving output from the handheld mobile device 100 such as external display devices and externally connected keyboards (not shown) can be considered within the scope of this disclosure.

Figure 4:
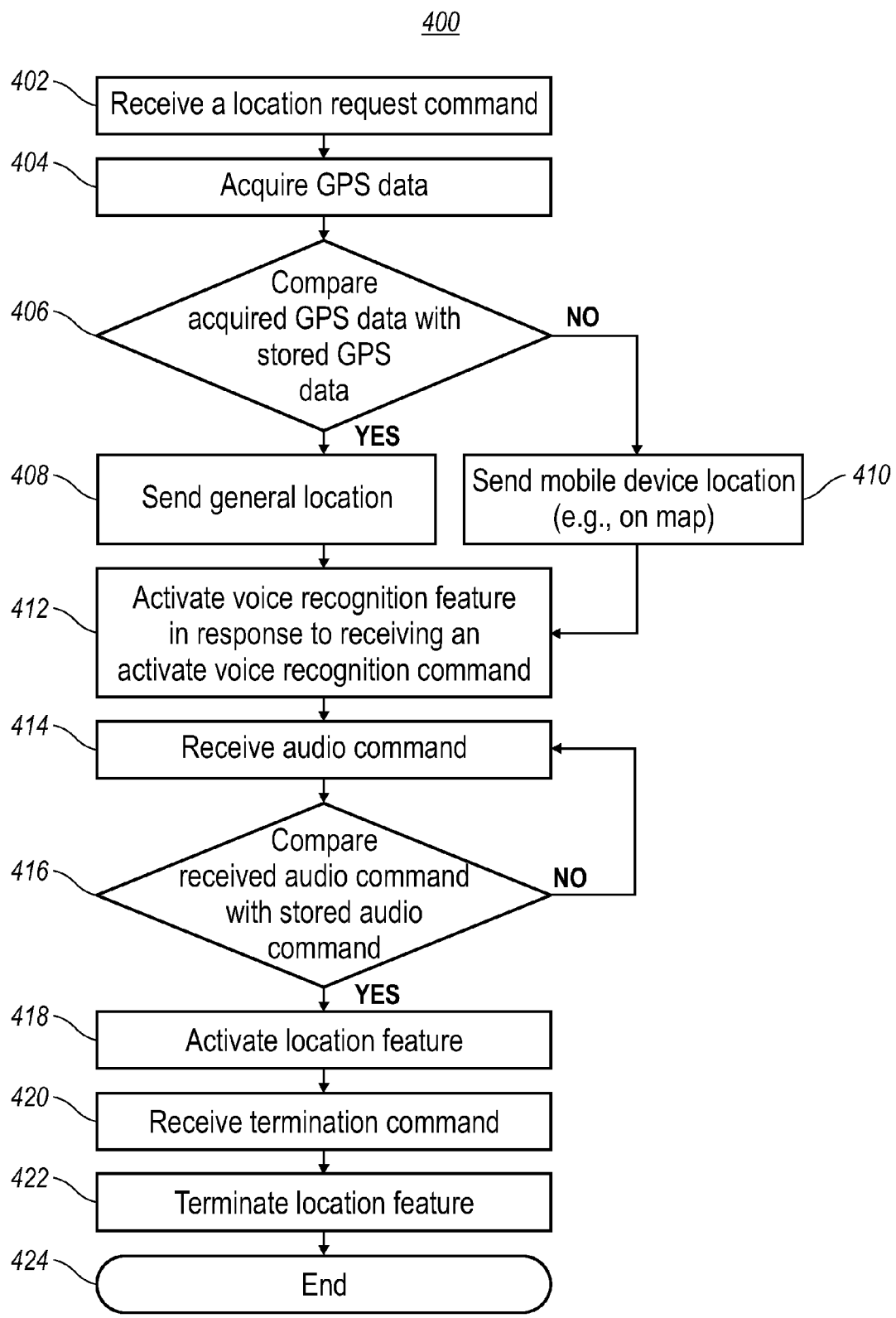
FIG. 4 is a flowchart for a method for locating a misplaced mobile device in accordance with an exemplary implementation.

Referring to FIG. 4, a flowchart for a method for locating a misplaced mobile device in accordance with an exemplary implementation is illustrated. The exemplary method 400 is provided by way of example, as there are a variety of ways to carry out the method. The method 400 described below can be carried out using the mobile devices and communication network shown in FIG. 3 by way of example, and various elements of these figures are referenced in explaining exemplary method 400. Each block shown in FIG. 4 represents one or more processes, methods or subroutines, carried out in exemplary method 400. The exemplary method 400 may begin at block 402.

At block 402, a location request command can be received. For example, the processor 338 of the mobile device 100 can receive a location request command from a requesting device. The requesting device can be another mobile device, a telephone, such as a landline based telephone, a computer or any other device that can transmit a location request command to the mobile device 100. The format of the location request command can be a call, email, personal identification number (PIN), short message service (SMS), multimedia message (MMS), an instant message, or any other signal requesting the location of the mobile device 100. For a call, the caller can enter a code such as a location request code or can provide an audio command for the location request. In one or more embodiments, a user can access a website with the website causing the transmission of the location request command to the mobile device 100. After receiving the location command, the method 400 can proceed to block 404.

At block 404, the global position system (GPS) data for the mobile device can be acquired. For example, the processor 338 or GPS module 362 can acquire the GPS coordinates or geo-location of the mobile device 100. The GPS coordinates can include the latitude and longitude coordinates. The geo-location can be a more meaningful location compared to GPS coordinates. For example, the geo-location can be a street address identifying the location of the mobile device 100. In one or more embodiments, the processor 338 can communicate with one or more servers to obtain a street address based on the GPS coordinates. After acquiring the GPS data of the mobile device 100, the method 400 can proceed to block 406.

At block 406, the acquired GPS data can be compared to stored GPS data. For example, the processor 338 can compare the acquired GPS data with stored GPS data. The GPS data can be stored in the memory 324 of the mobile device 100. For example, the GPS coordinates can be compared with stored GPS coordinates or the geo-location can be compared with stored geo-location. The stored GPS coordinates or stored geo-locations can include associated general geo-locations, such as "home" or "work". In one or more embodiments, the comparison of the GPS coordinates with stored GPS coordinates can include a deviation factor, for example, within 25 meters. In other words, there does not have to be an exact match, but rather a close match (for example, with a deviation factor) can result in a match. Thus, if the acquired GPS coordinates are a close match to stored GPS coordinates that have an associated geo-location, the comparison can identify the associated geo-location, e.g., "work". In one or more embodiments, in the event the GPS coordinates of the mobile device 100 are changing over a predefined time, the general location can be "car". In the event there is a match, the method 400 can proceed to block 408. In the event there is not a match, the method 400 can proceed to block 410.

Figure 5:
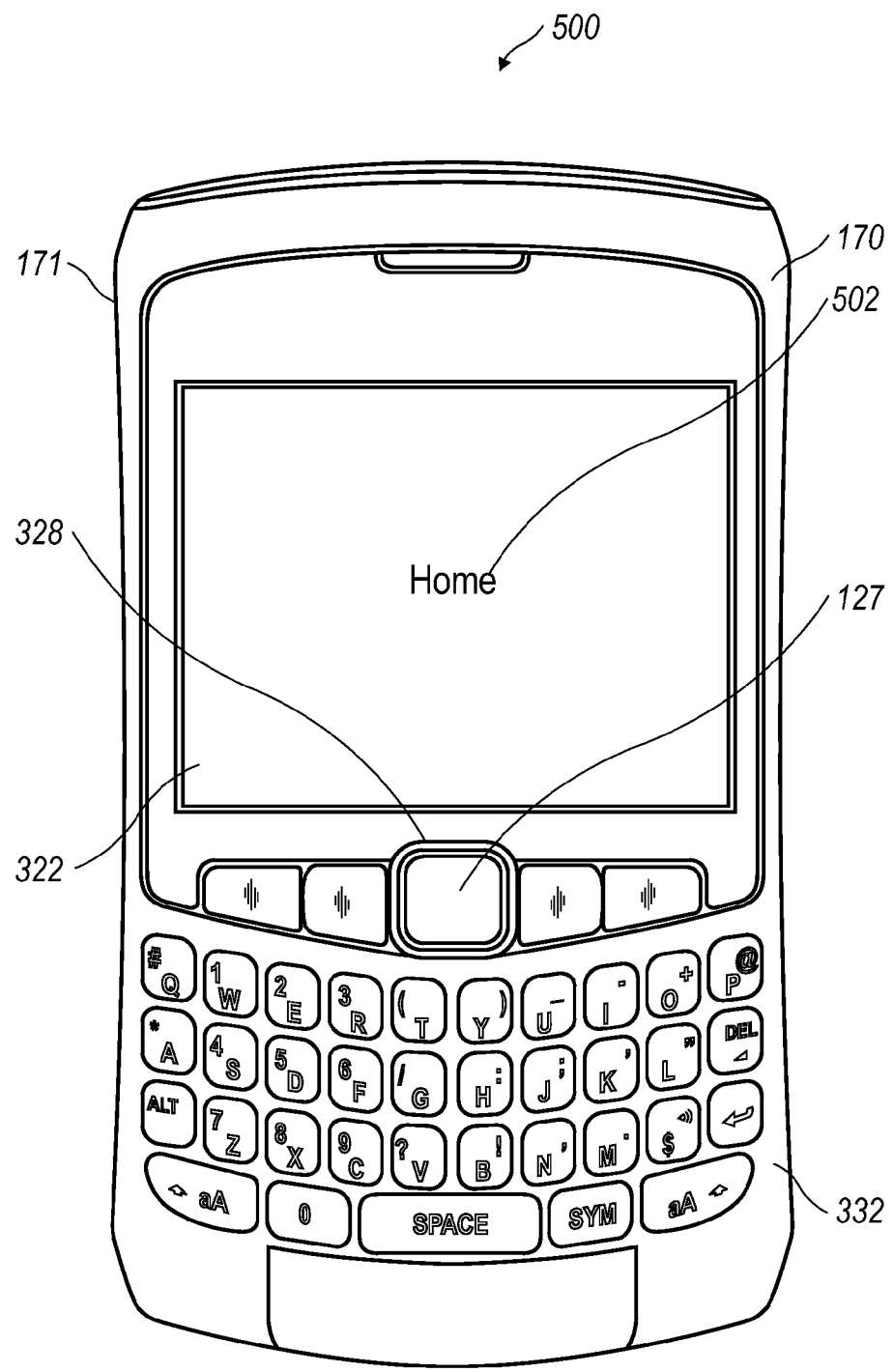
FIG. 5 is a front view of a requesting mobile device displaying a general location of the misplaced mobile device in accordance with an exemplary implementation.

At block 408, a general location of the mobile device can be sent to the requesting device. For example, the processor 338 can transmit a general location message to the requesting device. The general location message can be the same type of message as the location request message. For example, if the location request message was an email, then the general location message can be an email. FIG. 5 illustrates a front view of a requesting mobile device displaying a general location of the misplaced mobile device in accordance with an exemplary implementation. As shown, the requesting device, e.g., another mobile device 500, displays the exemplary general location of the misplaced mobile device 100 as being "home" 502. After transmitting the general location to the requesting device 400, the method 400 can proceed to block 412.

Alternatively, in the event there is not a match in between the acquired GPS data and stored GPS data, the method 400 can proceed to block 408 where one or more general locations can be sent to the requesting device, with the general locations providing an indication where the mobile device is NOT located. The method could then proceed to block 412.

Figure 6:
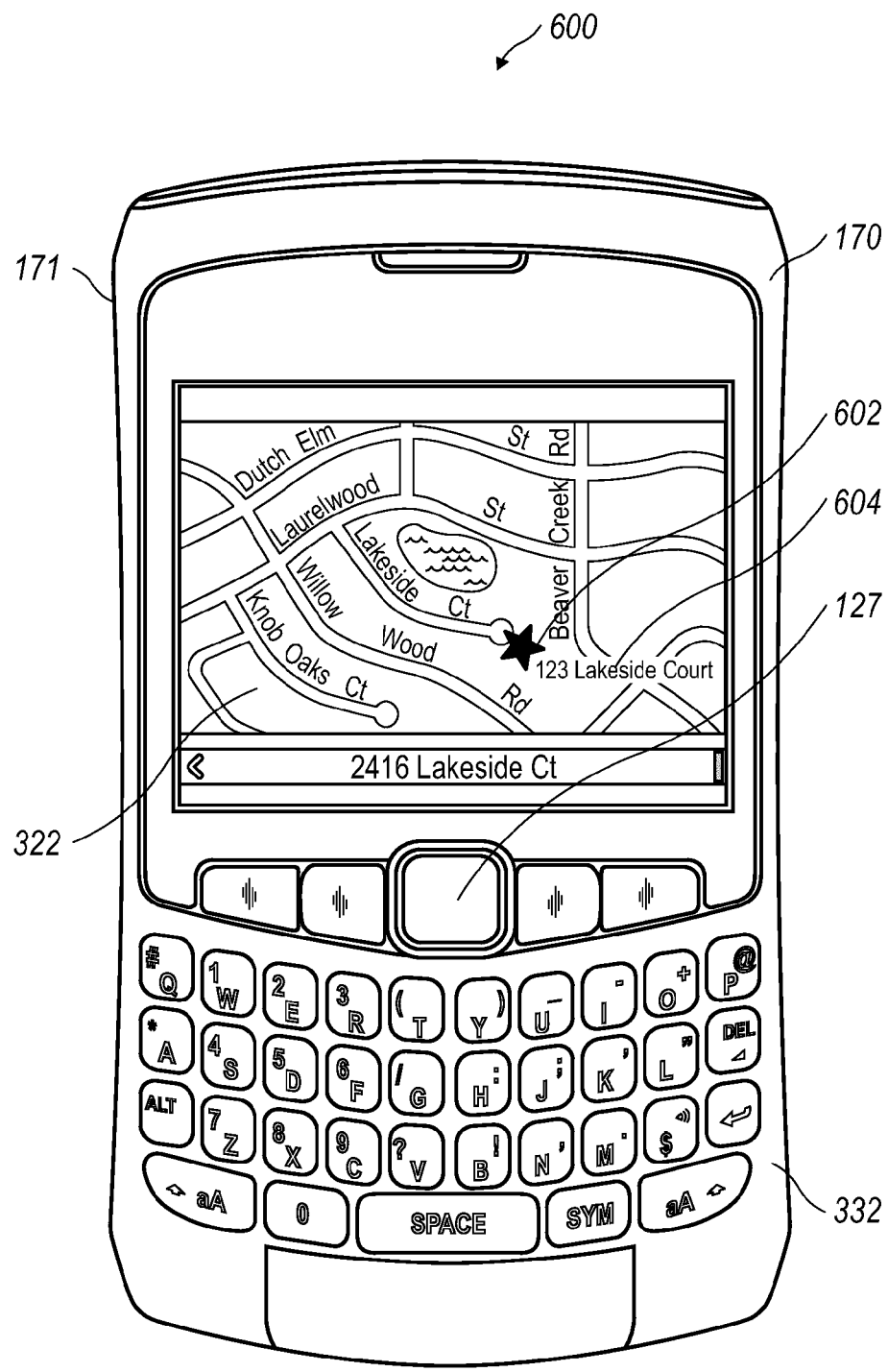
FIG. 6 is front view of a requesting mobile device displaying the geo-location of the misplaced mobile device on a map in accordance with an exemplary implementation.

At block 410, GPS data for the misplaced mobile device can be transmitted to the requesting device. For example, the processor 338 can transmit the GPS data to the requesting device. The GPS data can include the GPS coordinates, geo-location, or a combination of both. In one or more embodiments, the GPS data can include a map. In response to receiving the GPS data, the requesting device, can display the location of the misplaced mobile device using the GPS data. FIG. 6 illustrates a front view of a requesting mobile device displaying GPS data of the misplaced mobile device on a map in accordance with an exemplary implementation. As shown, the requesting device, e.g., another mobile device 600, displays a map with an indicator 602 indicating the location of the misplaced mobile device 100 along with an address, such as 123 Lakeside Court 604, associated with the GPS data of the misplaced mobile device 100. After transmitting the GPS data for the misplaced mobile device 100 to the requesting device, the method 400 can proceed to block 412.

At block 412, a voice recognition feature can be activated in response to receiving an activate voice recognition command. For example, the processor 338 can active a voice recognition feature in response to receiving an activate voice recognition command. The activate voice recognition command can be in one or more formats, such as an email, text message, SMS message, voice command, or any command that can activate the voice recognition feature. In the event the mobile device 100 is in a sleep mode, the mobile device 100 can be switched to an active mode to monitor audio commands. After activating the voice recognition feature of the mobile device 100, the method 400 can proceed to block 414.

At block 414, an audio command can be received. For example, the processor 338 can receive an audio command via the microphone 136. After receiving an audio command, the method 400 can proceed to block 416.

At block 416, the audio command can be compared with one or more stored location commands. For example, the processor 338 can compare the received audio command with one or more stored location commands. The stored location commands can be stored in the memory 124 of the mobile device 100. For example, the stored audio location command can be "locate my BlackBerry®". In one or more embodiments, the processor 338 can also compare the voice print of the audio command. The voice print can be used to identify the speaker and compare that to a list of people who are authorized by the device to initiate a search command. Thus, if a non-authorized user says the stored audio command, using the voice print, the processor 338 will not act in response to the audio command because the processor 338 recognizes that the user is not an authorized user. Depending on the setup of the method 400, a match can be based on voice recognition, voice print or both. In the event that the received audio command does not match the stored location command, the method 400 can proceed to block 414. In the event that the received audio command matches the stored location command, the method 400 can proceed to block 418.

At block 418, the location feature can be activated. For example, the processor 338, in response to the matching of the received audio command to the one or more stored location commands, can cause the mobile device 100 to emit one or more location signals. The location signal can be at least one of emitting a noise, causing vibrations, activating one or more lights such as the lighted display 322, or any combination thereof. Emitting a noise can include causing the mobile device 100 to produce a ring or a ring tone via the speaker 334. The ring tone can be a locate mobile device ring tone, for example, a special ring tone to locate the misplaced mobile device 100. In the event that the mobile device 100 is in a non-maximum volume mode, a vibrate only mode, or an alarm only mode, the processor 338 can override the ring volume setting and cause a maximum volume ring or ring tone. In one or more embodiments, the ring or ring tone can be an increasing ring or ring tone which can continue to ring at the maximum volume or can repeat an increasing ring volume which resets to an increasing ring tone once the maximum volume is reached. The location signal can cause the vibrator 360 to vibrate. The location signal can cause one or more lights, for example, the lighted display 322, to flash. The location signal can continue for a fixed amount of time or can have a preset duration, e.g., thirty seconds. In one or more embodiments, a user can set the desired location signal. After activating the location feature, the method 400 can proceed to block 420.

At block 420, a termination command can be received. For example, the processor 338 can receive the termination command or deactivation command. The deactivate command can occur after a preset duration lapses or a termination command is received. The termination command can be a specific code that is entered or any input that deactivates the location feature, for example, touching the optical navigation pad.

At block 422, the location feature can be deactivated. For example, the processor 338, in response to receiving a deactivate command, can deactivate or terminate the location feature. After deactivating the location feature, the method 400 can proceed to block 424. At block 424, the method 400 can end.

Although method 400 has specific steps, the method 400 is not required to execute each of the steps. For example, in one or more embodiments, the user does not have to use the location feature of the mobile device 100. In another example, in one or more embodiments, the voice recognition feature can be active without requiring receiving an activate voice recognition command. In such an embodiment, having to activate the location feature can reduce battery consumption. The audio command can be factory set, e.g., set prior to the selling of the mobile phone 100, or can be set by the user. In one or more embodiments, the user can provide the audio command so that the processor 338 is programmed to only recognize the voice print of the user.

The system and method described above can provide several benefits to a user of a mobile device 100. For example, using the voice recognition feature can allow a user to locate a misplaced mobile device 100. In the event, a user misplaces a mobile device 100, the user can use the location feature to determine the location of the misplaced mobile device. Using the general location feature allows a user to obtain a general location of the misplaced mobile device 100. After obtaining the general location of the misplaced device 100, the user is able to use the voice recognition feature to locate the misplaced mobile device 100.

Example embodiments have been described hereinabove regarding the implementation of a method and system for adjusting notification settings within a notification module 400 on network operable mobile devices 100. Various modifications to and departures from the disclosed example embodiments will occur to those having skill in the art. The subject matter that is intended to be within the spirit of this disclosure is set forth in the following claims.

What is claimed is:

1. A processor implemented method for activating a location feature for a mobile device, the method comprising:
   receiving, by a processor of the mobile device, a location request command;
   acquiring global positioning system (GPS) data in response to receiving a location request command;
   comparing, by the processor, acquired GPS data with stored data to obtain a general location of the mobile device;
   sending, by the processor, the general location to a communication device that sent the location request command;
   receiving, by the processor, an audio command;
   comparing, by the processor, the received audio command to one or more stored audio commands; and
   activating, by the processor, the location feature in the event the received audio command matches one of the one or more stored audio commands; and
   wherein activating the location feature further comprises activating a voice recognition feature in response to receiving an activate voice recognition feature command prior to receiving the audio command.

2. The processor implemented method as recited in claim 1 wherein comparing the received audio command further comprises comparing, by the processor, a voice print of the received audio command with the one or more stored audio commands having an associated voice print and activating the location feature in the event both the received audio command matches one of the one or more stored audio commands and the voice print of the received audio command matches the associated voice print.

3. The processor implemented method as recited in claim 1 wherein further comprises at least one of activating a ringer, activating a ring tone, causing vibrations, and flashing one or more light in response to the activation of the location feature.

4. The processor implemented method as recited in claim 3 wherein the ring tone is a location ring tone.

5. The processor implemented method as recited in claim 1 further comprising deactivating the location feature in response to at least one of a preset duration lapsing and receiving a termination command.

6. A mobile device comprising:
   at least one memory component;
   one or more stored audio commands stored in the at least one memory component; and
   a processor communicatively coupled to the at least one memory component, the processor configured to:
   receive a location request command;
   acquire global positioning system data in response to receiving the location request command;
   compare the acquired GPS data with stored data to obtain a general location of the mobile device; and
   send the general location to a communication device that sent the location request command;
   receive an audio command;
   compare the received audio command to the one or more stored audio commands; and
   activate a location feature in the event the received audio command matches one of the one or more stored audio commands; and
   wherein activate the location further comprises the processor configured to activate a voice recognition feature in response to receiving an activate voice recognition feature command prior to receiving the audio command.

7. The mobile device of claim 6 wherein the compare the received audio command further comprises comparing a voice print of the received audio command with the one or more stored audio commands having an associated voice print and activating the location feature in the event both the received audio command matches one of the one or more stored audio commands and the voice print of the received audio command matches the associated voice print.

8. The mobile device of claim 6 wherein the processor is further configured to cause at least one of the following: activate a ringer, activate a ring tone, cause vibrations, and flash one or more light in response to the activation of the location feature.

9. The mobile device of claim 8 wherein the ring tone is a location ring tone.

10. The mobile device of claim 6 wherein the processor is further configured to deactivate the location feature in response to at least one of a preset duration lapsing and receiving a termination command.

11. A non-transitory computer readable medium storing instructions for configuring a mobile device to execute instructions on a processor to:
   receive a location request command;
   acquire global positioning system (GPS) data in response to receiving a location request command;
   compare the acquired GPS data with stored data to obtain a general location of the mobile device;
   send the general location to a communication device that sent the location request command;
   receive an audio command;
   compare the received audio command to one or more stored audio commands; and
   activate a location feature in the event the received audio command matches one of the one or more stored audio commands;
   wherein the activate the location feature further comprises activating a voice recognition feature in response to receiving an activate voice recognition feature command prior to receiving the audio command.

12. The non-transitory computer readable medium of claim 11 wherein the compare the received audio command further comprises comparing a voice print of the received audio command with the one or more stored audio commands having an associated voice print and activating the location feature in the event both the received audio command matches one of the one or more stored audio commands and the voice print of the received audio command matches the associated voice print.

13. The non-transitory computer readable medium of claim 11 further comprising at least one of activating a ringer, activating a ring tone, causing vibrations, and flashing one or more light in response to the activation of the location feature.

14. The non-transitory computer readable medium of claim 13 wherein the ring tone is a location ring tone.

15. The non-transitory computer readable medium of claim 11 further comprising deactivating the location feature in response to at least one of a preset duration lapsing and receiving a termination command.

* * * * *